(12) United States Patent
Farmer

(10) Patent No.: US 7,000,810 B1
(45) Date of Patent: Feb. 21, 2006

(54) VEHICLE MOUNTED TOOL POUCH

(76) Inventor: Timothy R. Farmer, 14157 Riteway Rd., Mettawa, IL (US) 60048

( * ) Notice: Subject to any disclaimer, the term of this patent is extended or adjusted under 35 U.S.C. 154(b) by 71 days.

(21) Appl. No.: 10/427,203

(22) Filed: Apr. 30, 2003

(51) Int. Cl.
  *B60R 11/06* (2006.01)
  *A45F 5/00* (2006.01)

(52) U.S. Cl. .................. 224/404; 224/402; 224/543; 224/563; 224/901.8; 296/37.6; 296/37.8

(58) Field of Classification Search .............. 224/402, 224/404, 543, 563, 901.8; 211/70.6, 87.01, 211/160.01; 296/37.1, 37.6, 37.8, 37.13, 296/37.16; 248/231.91
See application file for complete search history.

(56) References Cited

U.S. PATENT DOCUMENTS

| 4,260,091 A | * | 4/1981 | French et al. ............... 224/311 |
| 4,819,800 A | * | 4/1989 | Wilson ....................... 206/373 |
| 4,901,899 A | * | 2/1990 | Barrett ....................... 224/223 |
| D354,728 S | * | 1/1995 | Shink ........................ D12/422 |
| 5,495,971 A | * | 3/1996 | Holliday ..................... 224/483 |
| 5,915,777 A | * | 6/1999 | Gignac et al. ........... 296/37.16 |
| 6,032,840 A | * | 3/2000 | Gregory ..................... 224/275 |
| 6,209,734 B1 | * | 4/2001 | Wang ...................... 211/87.01 |
| 6,789,714 B1 | * | 9/2004 | Benson et al. .............. 224/584 |

\* cited by examiner

*Primary Examiner*—Gary E. Elkins
(74) *Attorney, Agent, or Firm*—Law Office of Marc D. Machtinger, Ltd.

(57) ABSTRACT

The present invention is a tool pouch for mounting on a rear wall of a cab of a truck-like vehicle. The tool pouch has a backing which is preferably nylon or canvas. The front portion of the backing preferably has a plurality of pockets of different sizes and shapes, loops, hooks, T-hooks, clips for holding and storing a number of different tools and accessories in a neat, organized fashion. The tool pouch is attached to the rear wall of the cab by a number of attaching means such as by a groove attachment and mounting hook assembly, a hook and loop fastener attachment, or via a pair of snap fittings. In one embodiment, the tool pouch has support rods for additional support. The backing optionally includes an open space for disposing the pouch over a transmission drive hump.

16 Claims, 2 Drawing Sheets

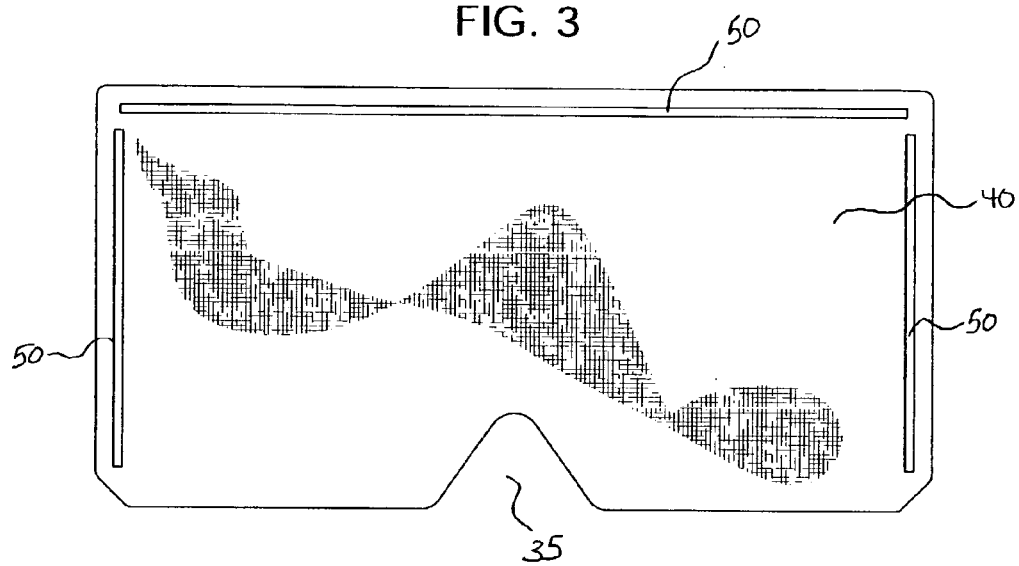
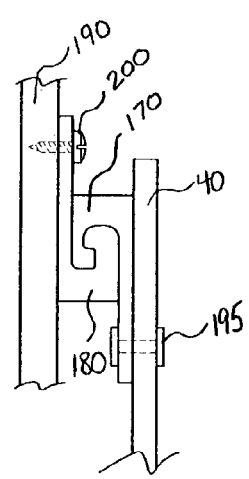
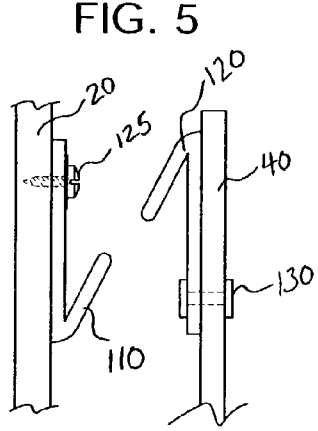
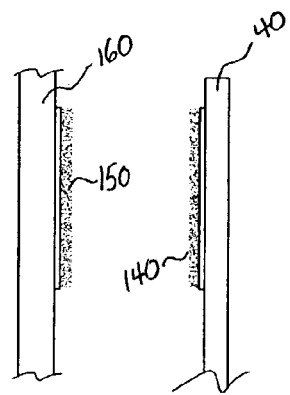

VEHICLE MOUNTED TOOL POUCH

TECHNICAL FIELD

The present invention relates to a tool pouch, and more specifically to a tool pouch having a plurality of pouches and supports for storing a plurality of tools and other items, and which is mounted on a rear wall of a cab of a truck-like vehicle.

BACKGROUND OF THE INVENTION

Several conventional tool storage devices are known and used for storing a plurality of tools and accessories. A number of such conventional tool storage devices are stored in a flatbed of a truck. These devices however are often time consuming to construct, use a large portion of the truck flat bed which could be better utilized for other purposes and do not allow a plurality of tools and accessories to be stored in a neat, organized fashion.

For example, U.S. Pat. No. 4,249,295, discloses a tool box which becomes an integral part of a pickup truck. The tool box has a plurality of tool drawers and has side doors for access to the tools. To install the tool box, the user must remove a portion of the truck bed directly behind the cab of the truck. The tool box is disposed within the removed portion. The installation of the device requires a great deal of effort, and also uses a large portion of the truck bed which significantly lessens the truck bed space available for the user for other purposes.

Similarly, U.S. Pat. No. 4,756,457, issued to Polk, discloses a cargo and storage apparatus for vans and similar vehicles. The cargo storage container has a pair of receptacles which form a closed, sealed compartment. The receptacles are hingedly mounted on the rear exterior of a van-like vehicle. The container or compartment can store a variety of items such as suitcases, bags, fishing equipment but is not adapted to store a number of different items in a neat, organized fashion. The user must store all items in one single compartment and smaller items would likely be difficult to find. Furthermore, the device require significant assembly, such as removing the tail lights to install the device, significantly increases the length of the vehicle, and requires one to alter the structure of his or her vehicle.

European Patent Publication No. EP 1162318, by Deere & Co. discloses an integral utility box which is mounted to a side of a work vehicle. The box has a plurality of walls. Each wall has a vertical pocket with horizontal steps extending across the pocket. The steps have a plurality of horizontally extending bars having open slots between adjacent bars. The device, however, is not adapted to store a variety of different sized tools or accessories neatly, including blueprints or extension cords, in a neat, organized fashion.

U.S. Pat. No. 5,088,636, issued to Barajas, discloses a rolling tool box which is slidably mounted between channels on opposite side walls of a flat bed pickup truck. The tool box can thus slide from a front end of the truck bed adjacent to the cab to the rear of the cab. The tool box allows the user repeated access to his or her tools without the need to jump on and off the truck bed. One disadvantage of the tool box size of the tool box takes up a great deal of space of the cab. Oftentimes, truck users need the full space of the flatbed of their trucks. Furthermore, although the tool box allows a user immediate access to his or her tools, the tool box has uniform drawers and thus is not adapted to store, for immediate access, a number of different tools or accessories in a neat, organized fashion.

U.S. Pat. No. 5,992,719, issued to Carter III, discloses a storage enclosure for a pick up truck. The enclosure is supported by the load deck sidewalls of a pickup truck. The storage enclosure is designed such that the tailgate of a truck provides access to the storage container. The storage contains spans substantially the width of the truck bed. The storage container is raised above the truck bed such that larger items such as lumber can be slid under the storage container and stored in the flatbed of the truck. Although the storage enclosure allows more use of the flat bed than other flatbed tool storage devices, the storage enclosure does not allow for organized storage a number of tools and items of different sizes such as blueprints, hammers, paint cans, or clipboards.

Some conventional tool storage devices are not adapted to fit on a vehicle, but are also not adapted to store a plurality of different sized tools and items in a neat, organized fashion with immediate access. For example, U.S. Pat. No. 4,911,296, issued to Hart, Jr., discloses a utility chest for emergency supplies which is stored within the trunk of a standard vehicle. The chest has a main storage compartment which has a plurality of partitions forming a plurality of individual compartments. There is a shallow drawer for storing tools. Further, there is a hinged lid having spring clip fasteners on the underside of the lid for storing additional items. The device would not be useful for an individual who desires quick and easy access to a plurality of tools and devices because the device would require one to repeatedly open and close the trunk of the vehicle.

Similarly, Japan Patent No. JP11139212, issued to Seishiro, discloses a multilayer sheet having a pocket which can be installed on the inner trunk lid surface of an automobile. The pocket is designed to hold frequently used tools or documents. The pocket in limited in size and thus is incapable of holding a number of different tools or accessories. Additionally, the device would not be useful for an individual who desires quick and easy access to a plurality of tools and accessories because the device would require one to repeatedly open and close the trunk of the vehicle.

Other conventional tool organizers are not designed to fit within a vehicle, but do allow for storage of different tools. However, these devices are not capable of being securely stored without transfer of the device to an additional storage device. Also, these devices similarly are not designed for neat, organized storage of a variety of tools or items of vastly different shapes and sizes. For example, U.S. Pat. No. 5,460,305, issued to Ahearn, discloses a magnetically mounted tool pouch. The tool pouch is designed for personnel working beneath a vehicle. The tool pouch contains a plurality of magnets for holding the pouch on a side of the vehicle. There are two different kinds of pouches affixed to its surface. A first type of pouch has two closed sides, a closed bottom, and an open top. A second type of pouch has two closed sides, a partially open bottom, and an open top for long handle tools. The pouches are not, however, adapted to house a plurality of other types of accessories, such as clipboards, tape, or blueprints, in a neat, organized fashion. Furthermore, the pouch cannot be stored securely unless the user transports the device to an additional storage location.

Another such conventional tool storage device is a tool pouch which is adapted to be wrapped around a bucket. The device has several pouches, however, these pouches are adapted for smaller tools. The device is therefore limited because the user is unable to hang any linear items or articles such as a T-square, blueprint or leveling stick on the pouch.

Additionally, the tools also cannot be stored securely without having to transport the device to an additional storage location.

Other conventional tool storage devices are known and used but such devices do not disclose any means of eliminating the insufficiencies discussed above. For example, U.S. Patent Publication No. 2001/0048268 by Switkes, discloses a compact egonomic weatherproof mobile workstation, preferably used for woodworking. The unit comprises multiple compartments by joining structural panels in perpendicular, parallel and opposing horizontal configurations. The compartments can house tools or other supplies while the workstation is configured such that its top surface may be used as a workstation. In a preferred embodiment, the unit is carried on a conventional utility trailer. This storage device is unnecessarily large for most users who merely need storage and easy access to a number of different tools and items. Furthermore, the compartments are not designed to store a plurality of tools and items of different sizes in a neat, organized manner.

U.S. Pat. No. 5,829,655, issued to Salopek, discloses a storage container which is assembled in the space behind the seats of an extended cab truck. The container is formed from a plurality of different panels, which also form different storage compartments. One disadvantage of this device is once the container is assembled, it is not possible to remove it from the truck. Furthermore, the panels preferably form four different compartments which are not adapted to store a number of tools and accessories of vastly different sizes such as blueprints, hammers, paint cans, or clipboards in a neat, organized fashion.

U.S. Pat. No. 6,450,571, issued to Canni et al., discloses a seat back system having a pocket for storing a storage case. The system comprises a rigid pocket secured within a recess between the back shell and foam bun of a vehicle seat. A storage case, which is similar to a briefcase, has a handle disposed on a side such that the case can be easily inserted and removed from the pocket. The storage case again is very limited in size and is not adapted to store larger items such as blueprints, drills, or extension cords in the same device.

U.S. Pat. No. 5,378,005, issued to Norton, discloses a portable tool truck having a molded plastic body. There is a first door mounted at one side of the body and a second door mounted at the opposite side of the body. There are numerous tool storage pockets, slots, and apertures defined in the truck body and in the interior of both doors to store a plethora of diverse tools. For individuals needing a means of storing a number of different tools in their vehicle, the truck is not a useful solution for varied tool storage for most individuals. The truck is large and cumbersome, and would require arduous labor to load and unload the truck onto a flatbed of a truck. Also, the truck would require additional security measures to prevent the tool truck, as a whole, from being stolen.

Therefore, it would be advantageous to provide a tool pouch having a plurality of pockets and supports to store a plurality of tools and accessories of different sizes, and which is preferably mounted on a rear wall of a cab of a truck-like vehicle providing immediate access and secure storage of the stored items within the protected interior environment of the vehicle.

SUMMARY

In view of the deficiencies described above, it is an object of the present invention to provide a tool pouch having a plurality of pockets and supports to store a plurality of tools and accessories of different sizes, and which is preferably mounted on a rear wall of a cab of a truck-like vehicle providing immediate access and secure storage of the stored items within the protected interior environment of the vehicle.

The present invention is a tool pouch for mounting on a rear wall of a cab of a truck-like vehicle. The tool pouch has a backing, which may be constructed from nylon, canvas, a combination of nylon and canvas, or any other suitable material having strength and durability. The tool pouch optionally includes rigid support rods to aid in supporting the tool pouch, especially when heavier tools or items are stored on or within the tool pouch.

On a front portion of the backing, there are a plurality of pockets which are adapted to hold and store numerous tools and items such as nails, bolts, washers, screws, screwdrivers, wrenches, wire cutters, writing utensils, spray paint cans, etc. There is preferably a first hook and a second hook disposed in spaced relation in a line parallel to a top edge of the backing, over a portion of the backing, and adapted to support a planar or cylindrical object such as a yardstick, T-square, leveling plane, or rolled paper blueprints therethough. Furthermore, the tool pouch optionally comprises at least one loop on the backing for holding a hammer or similar tool, at least one T-hook for holding an object placed thereon, a clip for clipping papers, and at least one open third hook on the surface for storing an extension cord or any other item capable of being supported by the hook.

The tool pouch is secured to the rear wall of the cab by a number of attaching means. In one embodiment, the attaching means comprises at least one fastener, such as a screw, for securing the pouch to the rear wall of the cab. In another embodiment, there is at least one bracket having a groove attachment that is adapted to mate with a mounting hook that is securely connected to a top portion of the backing such that the backing hangs on the groove attachment. The bracket is securely fastened to the rear wall of the cab by a screw, hook and loop fasteners, adhesive, or by any other suitable means. The mounting hook is secured to the backing by a rivet or any other suitable means. In another embodiment, a top portion of the backing has at least one first hook and loop fastener portion on a top back portion of the backing which is adapted to detachably connect to a second hook and loop fastener portion on a mounting portion on the rear wall of the cab. In yet another embodiment, the backing has a first snap-fitting affixed to a top back portion of the backing which is adapted to mate with a corresponding second snap-fitting on a bracket secured to the rear wall of the cab. The snap-fitting is affixed to the backing by a rivet or any other suitable means of connection. Furthermore, there is optionally at least one eyelet disposed on the backing for mounting the backing to the rear wall via securing a screw or other suitable attaching means through the eyelet.

There is further disclosed a combination of a vehicle and a tool pouch as previously disclosed comprising a vehicle having a substantially vertical rear cab wall, and a tool pouch mounted to an inside surface of said rear cab wall comprising at least a backing, a plurality of pockets disposed on a front portion of the backing, and an attaching means for mounting the pouch to the rear wall.

Other features and advantages of the invention will be apparent from the following detailed description taken in conjunction with the following drawings.

BRIEF DESCRIPTION OF THE DRAWINGS

FIG. 3 is a front view of another embodiment of the present invention showing the support rods.

FIG. 4 is a side view of yet another embodiment of the present invention.

FIG. 5 is a side view of yet another embodiment of the present invention.

FIG. 6 is a side view of yet another embodiment of the present invention.

DETAILED DESCRIPTION

Figure 1:
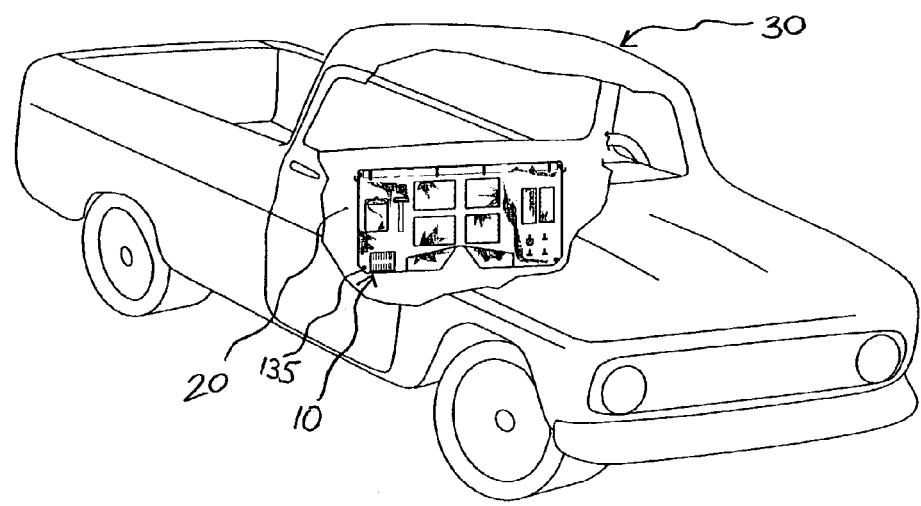
FIG. 1 is a perspective cut-away view of an embodiment of the present invention showing the tool pouch mounted on a rear wall of a cab of a truck.
Figure 2:
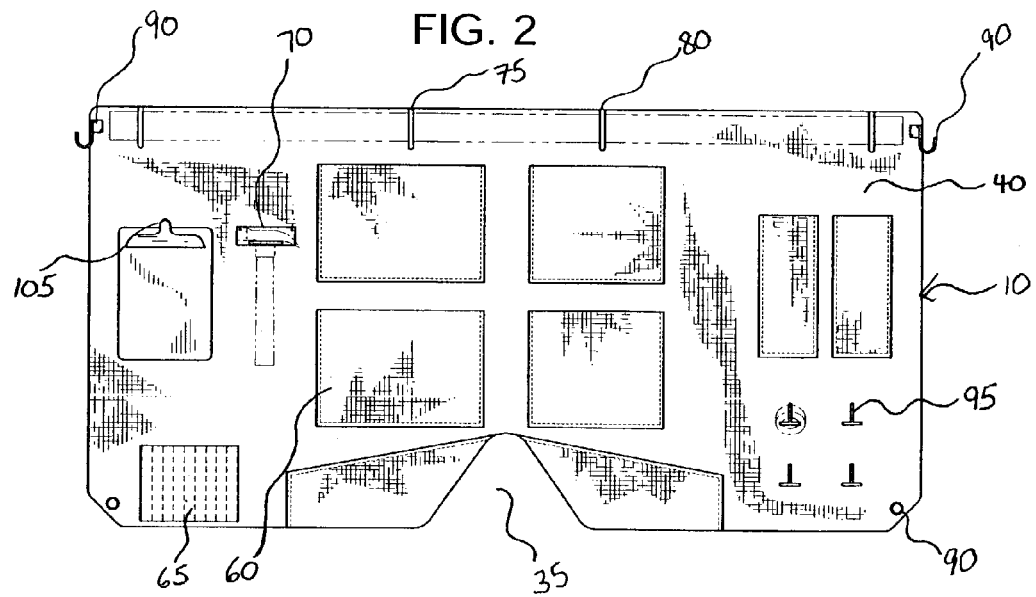
FIG. 2 is a front view of an embodiment of the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

The present invention is a tool pouch 10 for mounting on a rear wall 20 of a cab 30 of a vehicle such as a truck-like vehicle or pick-up truck. The pouch 10 has a backing 40, which may be constructed from nylon, canvas, a combination of nylon and canvas, or any other suitable material having strength and durability. Though constructed of a sturdy material, the tool pouch 10 optionally includes support rods 50 mounted in supporting relation along a length of a perimeter edge of the backing 40 to aid in supporting the tool pouch 10, especially when heavier tools or items are stored on or within the tool pouch 10. Preferably, the support rods 50 are constructed of stainless steel, but are optionally constructed from any other material having strength and durability. The support rods 50 may be placed along a length of the top portion of the tool pouch 10 or along a length on the sides of the tool pouch 10. The rods 50 are sewn into the pouch or are affixed to the tool pouch 10 by any other suitable means. The tool pouch 10 is preferably between 18 and 20 inches in height, and between 36 and 40 inches in width, but may be of any other size which fits along the rear wall 20 of a cab 30 of a truck-like vehicle. Also, there is an indented open space 35 along a center of a bottom portion of the backing 40 which allows the pouch 10 to fit over a transmission drive hump of a truck.

On a front portion of the backing 40, there are a plurality of pockets 60 which are adapted to hold and store numerous tools and accessories of different sizes, such as nails, bolts, washers, screws, screwdrivers, wrenches, wire cutters, writing utensils, spray paint cans, etc. There are sufficient pockets 60 of different sizes such that the user is able to store a large number of different sized tools and accessories in a neat, organized fashion without wasting valuable time to find a needed tool. For example, there is a pocket 65 having a plurality of dividers which is adapted to store a plurality of writing utensils. Also, there is preferably at least one loop 70 on the front portion of the backing 40 for supporting a hammer or similar tool. Additionally, there is preferably a first hook 75 and a second hook 80 disposed in spaced relation in a line parallel to a top edge of the backing 40, over a portion of the backing 20, and adapted to support a planar or cylindrical object, such as a yardstick, T-square, leveling plane, placed therethough. Optionally, the backing 40 has at least one open third hook 90 on its surface for storing an extension cord or any other item capable of being supported by the hook 90. The backing 40 also optionally comprises at least one T-hook 95 for holding an object placed thereon, and/or a clip 105 for clipping papers.

The tool pouch 10 is adapted to be attached to the rear wall 20 of a cab 30 of a truck-like vehicle behind the vehicle seats. The stored tools and accessories are thus securely stored within the truck. By having the tools in the cab 30 of the truck-like vehicle, the user also has easy and immediate access to his or her tools within a protected interior environment. There is optionally at least one eyelet 90 disposed on the backing 40 for mounting the backing 40 to the rear wall 20 via securing a screw or other suitable attaching means through the eyelet 90. Furthermore, the tool pouch 10 is secured to the rear wall 20 of the cab 30 by a number of alternative attaching means. In one embodiment, there also is at least one bracket 100 having a groove attachment 110 that is adapted to mate with a corresponding mounting hook 120 that is securely connected to a top portion of the backing 40 such that the mounting hook 120 hangs on the groove attachment 110. The bracket 100 is securely fastened to the rear wall 20 of the cab 30 by a screw 125, hook and loop fasteners, adhesive, or any other suitable means. The mounting hook 120 is secured to the backing 40 via a rivet 130 or any other suitable means. In another embodiment, the attaching means comprises at least one fastener 135, such as a screw 135, for securing the tool pouch 10 to the rear wall 20 of the cab 30.

In yet another embodiment, a top portion of the backing 40 has at least one first hook and loop fastener portion 140 on a top back portion of the backing 40 which is detachably connect to a second hook and loop fastener portion 150 on a mounting portion 160 on the rear wall 20 of the cab 30. In yet another embodiment, the backing 40 has a first snap-fitting 170 affixed to a back portion of the backing 40 which is adapted to mate with a corresponding second snap-fitting 180 on a bracket 190 secured to the rear wall 20 of the cab 30. The snap-fitting 170 is affixed to the backing by a rivet 195 or any other suitable means of connection. The bracket 190 is secured to the rear wall 20 of the cab 30 by a screw 200 or any other suitable means of connection.

There is further disclosed a combination of a vehicle and a tool pouch as previously disclosed comprising a vehicle having a substantially vertical rear cab wall 20, and a tool pouch 10 mounted to an inside surface of said rear cab wall 20 comprising at least a backing 40, a plurality of pockets 60 disposed on a front portion of the backing 40, and an attaching means for mounting the tool pouch 10 to the rear wall 20.

While the specific embodiments have been illustrated and described, numerous modifications come to mind without significantly departing from the spirit of the invention, and the scope of protection is only limited by the scope of the accompanying claims.

What is claimed is:

1. A tool pouch for mounting to a rear wall of a cab of a vehicle, comprising:
    a backing,
    a plurality of pockets disposed on a front portion of said backing, and
    an attaching means for mounting said pouch to said rear wall wherein at least a first hook and a second hook are disposed in spaced relation in a line parallel to a top edge of said backing over a portion of said backing and adapted to support a planar or cylindrical object placed therethrough.

2. The tool pouch according to claim 1, wherein said backing further comprises at least one third hook disposed on a front portion of said backing adapted to support an additional object.

3. The tool pouch according to claim 1, wherein said pouch further comprises at least one supporting rod mounted in supporting relation along a length of a perimeter edge of said backing.

4. The tool pouch according to claim 1, wherein said backing further comprises at least one loop disposed on the front portion of said backing for supporting an object.

5. The tool pouch according to claim 1, wherein said backing further comprises at least one open third hook disposed on the front portion of said backing for supporting an object.

6. The tool pouch according to claim 1, wherein said backing further comprises at least one clip on said backing for clipping papers or other object thereto.

7. The tool pouch according to claim 1, wherein said backing further comprises at least one T-hook on said backing for holding an object placed thereon.

8. The tool pouch according to claim 1, wherein said backing is constructed of nylon.

9. The tool pouch according to claim 1, wherein said backing is constructed of canvas.

10. The tool pouch according to claim 1, wherein a portion of said backing further comprises an open space along a centered bottom portion of said backing such that said tool pouch is adapted to fit over a transmission drive hump of said vehicle.

11. The tool pouch according to claim 1, wherein said pouch has a height in the range of 18 inches to 20 inches and a width in the range of 36 to 40 inches.

12. The tool pouch according to claim 1, wherein said plurality of pockets are of different sizes and shapes.

13. A tool pouch for mounting to a rear wall of a cab of a vehicle comprising:
a backing,
a plurality of pockets disposed on a front portion of said backing, and
an attaching means for mounting said pouch to said rear wall, wherein said attaching means comprises a bracket having a groove attachment securely connected to said rear wall, and a mounting hook disposed on a top portion of said pouch adapted to mate with said groove attachment.

14. The tool pouch according to claim 13, wherein said mounting hook is secured to said backing via a rivet.

15. A tool pouch for mounting to a rear wall of a cab of a vehicle, comprising:
a backing,
a plurality of pockets disposed on a front portion of said backing, and
an attaching means for mounting said pouch to said rear wall, wherein said attaching means comprises a first snap-fitting fixedly connected to a top back portion of said backing adapted to mate with a corresponding second snap-fitting on a bracket secured to the rear wall of the cab.

16. The tool pouch according to claim 15, wherein said first snap-fitting is secured to said backing via a rivet.

* * * * *